H. L. VAN VALKENBURG.
AUTOMATIC MOTOR STARTER.
APPLICATION FILED AUG. 21, 1916.
1,266,642.
Patented May 21, 1918.
3 SHEETS—SHEET 3.
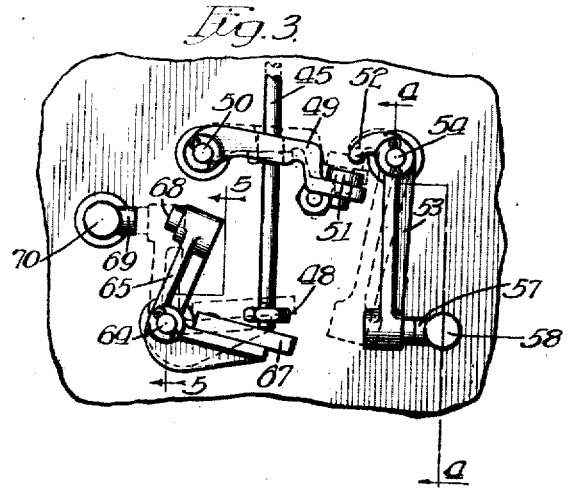
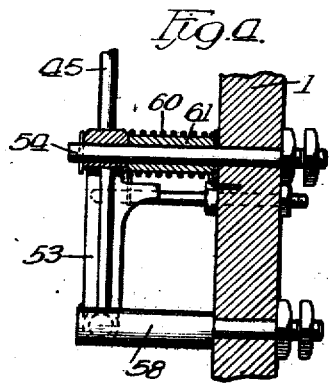
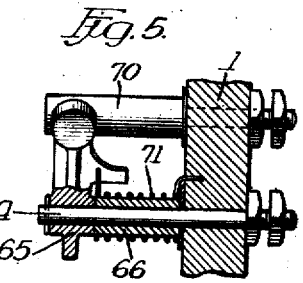
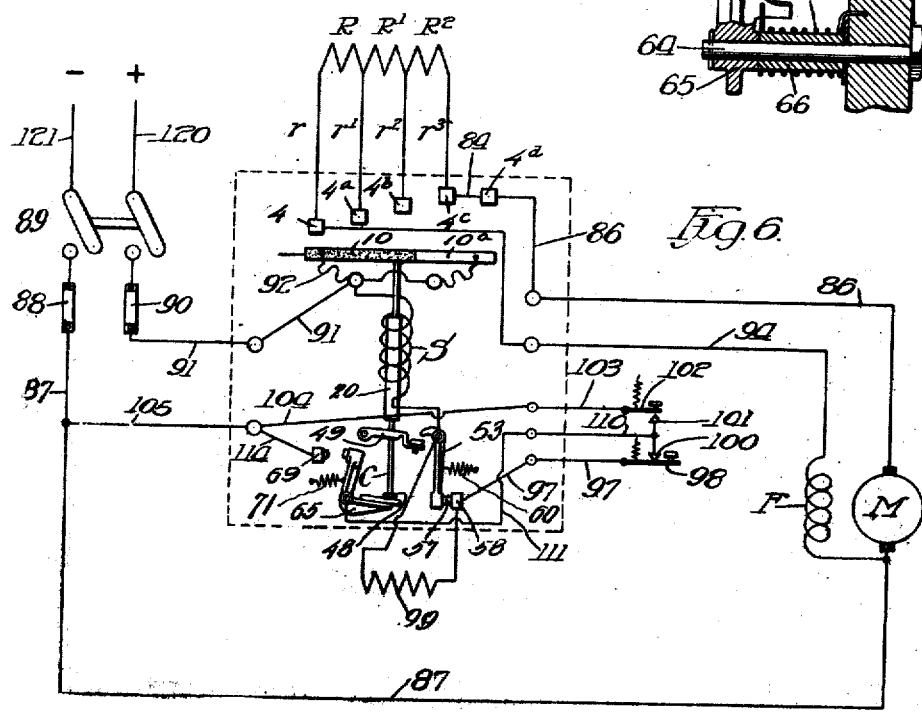
Inventor
By Hermon L. Van Valkenburg.
Cheever & Cox Attys

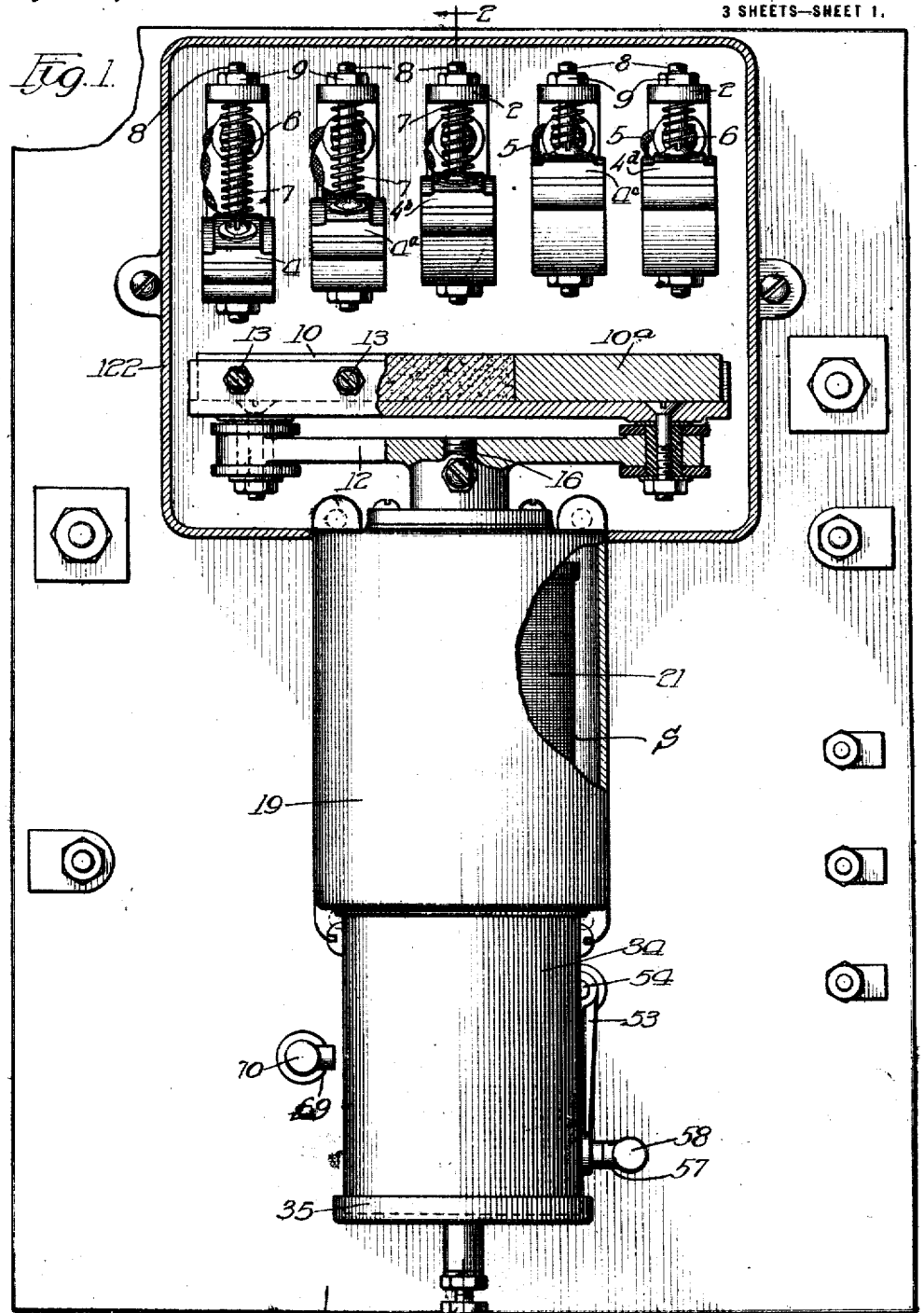

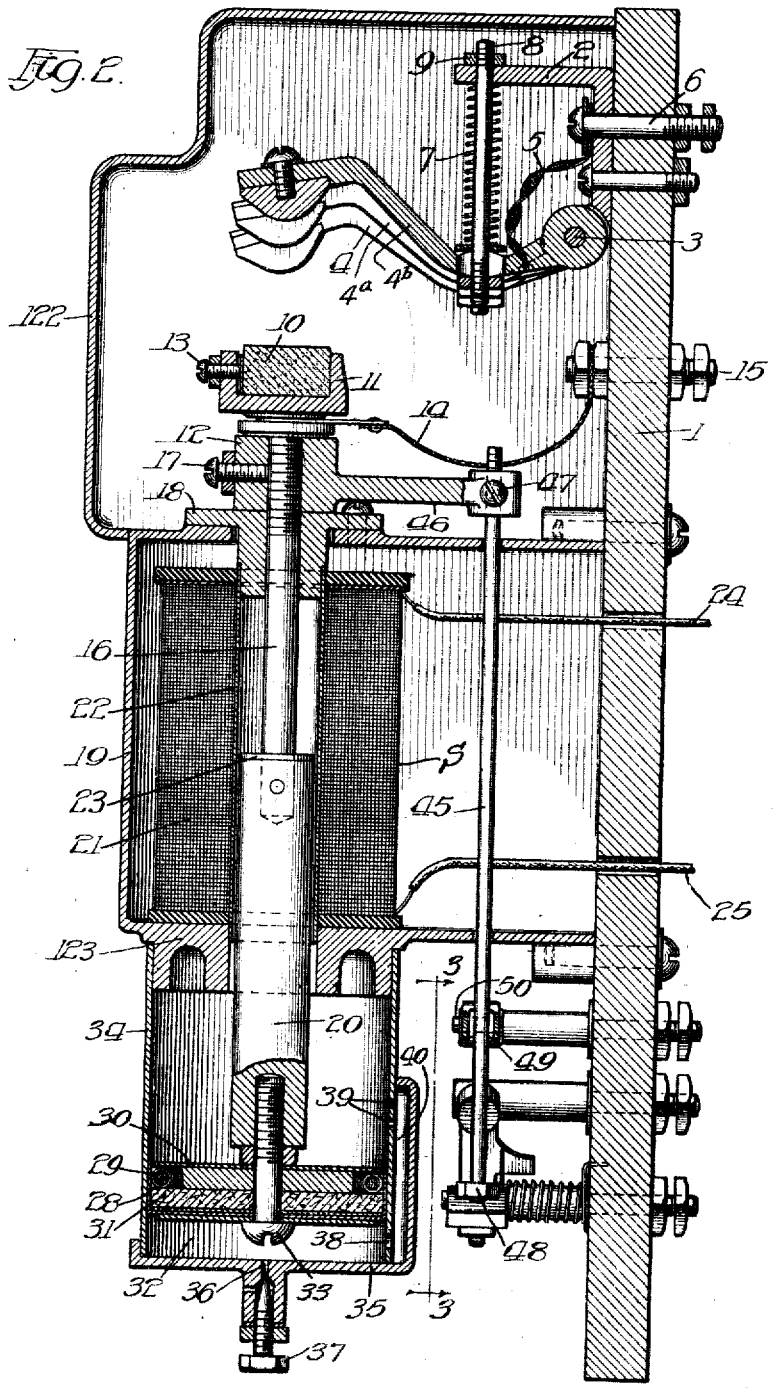

UNITED STATES PATENT OFFICE.

HERMON L. VAN VALKENBURG, OF MILWAUKEE, WISCONSIN, ASSIGNOR TO INDUSTRIAL CONTROLLER COMPANY, OF MILWAUKEE, WISCONSIN, A CORPORATION OF WISCONSIN.

AUTOMATIC MOTOR-STARTER.

1,266,642.      Specification of Letters Patent.      Patented May 21, 1918.

Application filed August 21, 1916. Serial No. 115,953.

*To all whom it may concern:*

Be it known that I, HERMON L. VAN VALKENBURG, a citizen of the United States, residing at Milwaukee, in the county of Milwaukee and State of Wisconsin, have invented a certain new and useful Improvement in Automatic Motor-Starters, of which the following is a specification.

My invention relates to starters for electric motors, and the general object of the invention is to produce a simple, durable and effective device, whereby upon the closing of the control circuit, the device will automatically, and in proper order, and at the proper intervals of time, control the circuit relations of the different sections of starting resistance. In the wiring diagram here used to illustrate the principle of the invention, the sections of starting resistance are connected in the armature circuit, and are successively cut out of circuit during the automatic operation of the device. My device is so constructed and arranged that a momentary closing of the control switch is sufficient to set the device in operation and keep it in operation until the program of operation is completed. Another characteristic is that the main operating solenoid is protected by means which automatically reduces the amount of current passing through the operating solenoid as soon as the main switch element has reached running position. This saves overheating of the operating coil and has other advantages. Another characteristic is that the initial movement of the main switch follows almost instantaneously after the closing of the control switch, the remainder of movement of said main switch being at a slower rate. In carrying out the invention, the control circuit has two parallel branches. The first of these branches is on normally open circuit and is closed by the operator when he wishes to start the motor. The second branch has in it a holding switch which is self-closing when released but which is held open by the main switch when the latter is in normal non-running position. But although said holding switch is held open by the main switch element, it is detached therefrom with the result that the holding switch does not in any way limit the movement of the main switch, said main switch having a considerable distance to travel to short circuit all of the starting resistance.

I accomplish my objects by the mechanism illustrated in the accompanying drawings in which:—

Figure 1 is a front assembly view of the device, partly in front elevation and partly in vertical section.

Fig. 2 is a sectional view, chiefly on the line 2—2, Fig. 1.

Fig. 3 is a detailed elevation viewed in the direction of the arrows on the line 3—3, Fig. 2.

Fig. 4 is a sectional detail view on the line 4—4, Fig. 3.

Fig. 5 is sectional detail view on the line 5—5, Fig. 3.

Fig. 6 is a wiring diagram illustrating the principle of operation of the invention.

Similar numerals refer to similar parts throughout the several views.

Referring first to the physical apparatus shown in the first five figures of the drawings, I provide a panel 1 of slate or other insulating material to form a main support for the parts. Fastened to the front of this panel is a row of brackets 2, each of which carries a pivot pin 3 which forms a fulcrum for its respective contact finger 4, there being shown five of the latter indicated at 4, $4^a$, $b^b$, $4^c$, and $4^d$. Each of these fingers is connected by a flexible resistance 5 to a stud 6, which passes through the panel to the back where it may be connected to the proper conductors in the manner which will hereinafter become apparent. These contact fingers are normally held depressed by springs 7, which surround the rods 8 and are backed up by the projecting portion of the bracket. The contact fingers are arranged at different elevations or in different "ranks" so that they may be engaged successively by the main switch as the latter rises. Their downward movement is limited by the nuts 9 which seat on the top of the brackets.

The main switch element in the present design has a bar which preferably has one part 10 of carbon and another part $10^x$ of copper. It is arranged horizontally beneath the free ends of the contact fingers and is supported in the channel member 11, carried by but insulated from the cross arm 12. In the preferred design the bar is removably held in place by set screws 13, and consequently may be readily renewed when necessary. Said bar is connected in circuit through a flexible conductor 14 leading to a stud 15, passing through to the back of the panel. Cross arm 12 is supported preferably at the middle by a stem 16, which is screw threaded into it and fastened by a set screw 17 or other suitable device. Stem 16 is guided by a solenoid frame cap 18 which is fastened at the top of the solenoid frame 19. Said frame is bolted or otherwise rigidly secured to the panel. At the lower end of stem 16 is a movable core 20 of a solenoid S which core travels within the of a main operating coil 21. By preference stem 16 is of brass and coil 21 is lined with a cylinder 22 of brass, and a brass washer 23 is placed at the upper end of the core to prevent same from sticking to the cap 18 as a result of residual magnetism. Coil 21 is energized through the conductors 24 and 25.

Fastened to the lower end of core 20 is a piston which, according to the present design, has a very flexible cup leather 28, normally held expanded by a torus 29 of helically wound wire, said spring being overlaid by a disk 30. A disk 31 of felt or other suitable material is also provided, the same being supported upon a disk 32, supported by the head of the screw 33 which screws into the lower end of the core. This piston travels within the cylinder 34 which is rigidly fastened to the bottom of the solenoid frame. The cylinder and piston form what may be termed a "vacuum dash pot." At the lower end of the dash pot is a head 35 which has a port 36, the effective opening whereof is controlled by a needle valve 37. A port 38 is formed in the side of the dash pot near the lower end. At a proper distance above this is a second port 39 formed of one or more apertures. A passage 40 leads from one of these ports to the other on the outside of the dash pot and forms a by-pass. This by-pass is preferably integral with the cylinder head. As a result of the presence of these ports and by-pass, an upward pull of the solenoid produces initially a very rapid upward movement of the piston, for the fluid (in this case, air) may readily flow down through the by-pass. As soon, however, as the upper port 39 is closed, the upward movement of the piston becomes retarded and thereafter the rise of the moving parts is slow. When the piston is moving upward in the dash pot, as soon as it passes the ports 39, it compresses the air above it and this compressed air helps to move the piston downward rapidly as soon as the solenoid has become deënergized. Thus, when the solenoid is deënergized both the compressed air in the cylinder and gravity coöperate with the pressure of the contact fingers 4 to quickly lower the main switch bar. The fingers which descend farthest will continue their pressure after the contact bar has moved the fingers which are higher up, and thus the action of the device in opening is very quick.

I have provided a protective resistance in series with the main switch solenoid 21 and means for automatically cutting this resistance into circuit after the main switch has reached closed or final running position. It requires less electromagnetic pull to hold the main switch closed than to move it to closed position, and by thus cutting down the current through the solenoid after the main switch is closed the solenoid is protected against overheating. I will now describe the means by which this protective resistance is automatically brought into circuit: An operating rod 45 is fastened at its upper end to a projection 46 extending rearward from the cross arm 12, as best shown in Fig. 2. The rod screws into said projection and when properly adjusted, is held by a set screw 47. A nut 48 is carried at the lower end of the rod, as best shown in Fig. 3, and when the rod has almost reached its uppermost position the nut engages and lifts the lever 49, which is pivoted upon the fulcrum pin 50 which projects from the front of the panel. The free end of the lever is preferably provided with a block 51 of insulating material which, upon the rise of the lever, engages the nose 52 of a lever 53, which is fulcrumed upon the stud or post 54, projecting from the front of the panel. For convenience, the lever 53 may be referred to as a "protecting switch," and in the preferred design, it is in electric contact with post 54 which, in turn, is adapted at the rear end of the panel to be electrically connected to a suitable conductor, as best shown in Fig. 4. At the free end said switch carries a carbon tip 56 in position to engage a carbon tip or block 57 carried by the post 58 projecting from the panel. In the present design, this post forms part of the circuit, being adapted to be electrically connected to a conductor at the back of the panel. Switch 53 is normally held closed, that is, with tip 56 in contact with tip 57. This is accomplished in the present design through the medium of a helical spring 60 which encircles spacing sleeve 61 supported upon posts 54, as best shown in Fig. 4. The arrangement of the parts is such that a very slight movement of the free end of the lever 49 will move the switch 53 to a safe distance away from post 58 to prevent arcing.

I have also provided means for holding the control circuit closed as soon as the push button or other control switch has been closed even though said control switch remains closed but momentarily, and is thereupon immediately released, I will now describe this holding means:

Projecting from the front of the panel is a fulcrum post 64, shown in detail in Figs. 3 and 5. This post is adapted to be electrically connected to the conductor at the back of the panel and forms a fulcrum for holding lever 65. Said lever in the present design is held spaced from the panel by a sleeve 66 which encircles the post. One arm of said lever is provided with a block of insulation 67, located in position to be engaged by the lower end of the operating rod 45. The other arm of the lever has, by preference, a carbon tip 68 adapted to engage the carbon tip 69 carried by the post 70. Post 70 projects from the front of the panel and is adapted to be electrically connected to the conductor at the back of the panel. A spring 71 which in the present instance encircles the sleeve 66 is fastened at one end to the panel and at the other end to lever 65 and tends to normally hold the switch 65 in contact with post 70. This spring, however, is weak enough to be overcome by the force of the rod 45 when the latter descends, and hence while the holding lever 65 tends to move automatically to closed position, it will remain in open position when the main switch is open. But as soon as the solenoid 21 of the main switch has become energized and the main switch has traveled a slight distance toward closed position, the holding switch 65 will automatically move to closed position, and thereafter hold its circuit closed until the main switch returns to open position.

I will now further explain the operation of the mechanism by describing the diagram shown in Fig. 6.

R, R¹, R² and R³ represent three sections of starting resistance connected together in series. These are connected at the ends by conductors $r$, $r^1$, $r^2$ and $r^3$ to contact fingers 4, 4ª, 4ᵇ, and 4ᶜ. Finger 4ª is electrically connected by conductor 84 to contact finger 4ᵈ. Finger 4ᵈ is connected by a conductor 86 to one of the terminals of the armature M of the motor. The other terminal of said armature is connected by a conductor 87 through a fuse 88 to one side of a two pole supply switch 89. The other side of said switch is connected through a fuse 90 and conductor 91, to one end of the solenoid S. Conductor 91 is also connected by a flexible conductor 92 to the conductor bar 10—10ª. Bar 10—10ª is carried by the core 20. The parts are so constructed that when the solenoid is energized it will cause the bar 10—10ª to rise and engage the fingers 4, 4ª, 4ᵇ and 4ᶜ in the order named, finally engaging the two fingers 4ᶜ and 4ᵈ and short circuiting the resistance. Finger 4 is connected by a conductor 94 to the field coil F which is arranged in shunt with the armature of the motor M. The opposite end of solenoid S is connected to the protecting switch 53. This switch is normally in engagement with the stationary contact 57 which is connected by the conductor 97 to the "stop switch" 98. The protecting resistance 99 is connected at one end to the post 58 and at the other to the protecting switch 53 so that when the switch is opened the resistance will be in circuit and when the switch is closed the resistance will be short circuited. The stop switch 98 is normally held in engagement by the stationary contact 100 which is electrically connected to the stationary contact 101. Contact 101 is in position to be engaged by the starting control switch 102 which is normally held out of engagement with contact 101. Switch 102 is connected by conductors 103, 104 and 105 to the conductor 87 which is connected to one side of the supply switch. The contacts 100 and 101 are connected by conductors 110 and 111 to the holding switch 65. Switch 65 tends to engage the stationary contact 69 which is connected by the conductor 114 to the conductor 105. The holding switch 65 is adapted to be held open by the rod 45 which moves in unison with the core 20. Rod 45 has a nut 48 which is adapted to engage the lever 49 when the core rises and thus cause the opening of the protecting switch 53.

Operation: For convenience, let it be assumed that the supply conductors 120 and 121 represent the positive and negative sides respectively of the supply circuit, the same being connected to the two sides of the double pole switch 89, so that when the switch is closed conductor 120 will be connected to the conductor 91 and conductor 121 will be connected to the conductor 87. Let it be assumed, also, that the parts are in the non-running position, shown in the diagram. If now the operator closes the control switch 102 he will energize the solenoid S, for the current will flow through it as follows: from conductor 120 and fuse 90 to the conductor 91, thence through the solenoid S, thence through the protecting switch 53, contact 57, post 58, conductor 97, switch 98, contact 100, contact 101, switch 102, conductors 103, 104, 105 and 87, fuse 88 and out through the conductor 121. Almost instantly after switch 102 has been closed, the core 20 and operating rod 45 will have risen sufficiently to release the holding switch 65, and cause it to engage the stationary contact 69. As soon as this engagement takes place, the current will be led from contact 100 to conductor 110, thence through the switch 65, contact 69, conductor 114, to the conductor 105. As soon as switch 65 reaches closed position control switch 102 may be opened without opening the circuit through the solenoid S. Hence, it is only necessary for the operator to hold the switch closed momentarily, after which he may leave it and yet the apparatus will continue with its program of operation. As the core 20 rises, it causes the bar or main switch 10—10ª to rise and engage the fingers 4, 4ª, 4ᵇ, 4ᶜ successively, thus first closing the armature circuit through all the starting resistance and thereafter cutting out one section of resistance after another from the armature circuit and permitting the motor to accelerate at a proper rate. Owing to the presence of the by-pass 40 of the dash pot of the physical structure, the initial movement which permits the holding switch to close will be very rapid. After that the rise of the parts is much slower, being regulated by the action of the dash pot.

When the main switch 10—10ª is about to reach final running position, the nut 48 engages the lever 49 and causes the latter to open the protecting switch 53. Thereupon, the current passing from the solenoid instead of passing directly through the protecting switch to the contact 57, is forced to pass through the resistance 99. As a result of this added resistance in the circuit, the current passing through the solenoid is greatly reduced, although still sufficient to securely hold the main switch in final running position. By thus reducing the amount of current flowing through the solenoid, overheating of the solenoid is prevented. Thus in my device, I obtain a strong pull on the main switch during the movement to closed position, but immediately thereafter reduce the amount of current passing through the solenoid and thus avoid all danger of overheating it.

When it is desired to stop the motor, the operator opens the "stop" switch 98 whereupon the solenoid is deënergized, the movable parts quickly drop and open the switch 65 thus permanently holding the circuit open until the control switch 102 is again closed.

In this, the preferred construction, the main switch 10—10ª when closed is in engagement with two contacts 4ᵉ and 4ᵈ instead of but one. This increases the amount of contact surface in use and correspondingly reduces the contact resistance and correspondingly improves the efficiency of the contact.

It will be observed that in addition to the advantageous electrical features of my device, there are important structural advantages. For example, the parts are compact and symmetrical, and hence are adapted to be inclosed in a comparatively small and symmetrical casing 122. Also, the dash pot cylinder is mounted directly upon the solenoid frame 123, thus forming a very rigid construction which always maintains absolute alinement between the cylinder and the solenoid. Furthermore, the levers and switches are simple in construction and durable and may be readily replaced in case of need.

Having thus described my invention, what I claim as new and desire to secure by Letters Patent, is:

1. In an automatic starter, a starting resistance, a movable element for short circuiting said resistance, a control circuit, and an electromagnetic coil in said control circuit for operating said movable element, said control circuit having two parallel branches, one of said branches being closable by the closure of a normally open control switch, and the other branch having a normally closed holding switch held open by the movable short circuiting element when the latter is in non-running position, the holding switch being a self closing switch and being detached from said short-circuiting element.

2. In an automatic starter, a starting resistance, a movable element for short circuiting said resistance, a control circuit, an electromagnetic coil in said control circuit for operating said movable element, said control circuit having two parallel branches, the control circuit being consequently closed when either one of said branches is on closed circuit, a control switch for closing one of said branches, and a holding switch for closing the other of said branches, the control switch tending to remain open and the holding switch tending to remain closed, said holding switch being held in open position by said movable element when said movable element is in non-running position, and said holding switch being detached from the movable element and being released during the initial portion of the movement of said movable element toward running position.

3. In an automatic starter, a starting resistance having a plurality of sections, and contacts for said sections arranged in echelon, a short-circuiting element movable into engagement with said contacts *seriatim*, a control circuit, an electro-magnetic coil in said control circuit for operating said short-circuiting element, said control circuit having two parallel branches, a control switch for closing one of said branches, and a holding switch for closing the other of said branches, the holding switch being a self closing switch held in open position by the short circuiting element when said short circuiting element is in non-running position, said short circuiting element being detached from said holding switch, whereby its movement is unlimited by the holding switch.

4. In a starting device for electric motors, a starting resistance having a plurality of sections with contacts arranged in different ranks, one behind the other, a main switch movable into engagement with said contacts *seriatim*, a control circuit, an electromagnetic winding in said control circuit for operating said switch, said control circuit having two parallel branches, a control switch for closing one of said branches, and a holding switch for holding the other of said branches, the holding switch being spring-pressed toward closed position, and being in position to be engaged by said main switch and moved to open position by it when the latter is in normal non-running position, the travel of the main switch exceeding the travel of the holding switch, and the main switch being detached from said holding switch, to thereby prevent the holding switch from limiting the movement of the main switch.

In witness whereof, I have hereunto subscribed my name.

HERMON L. VAN VALKENBURG.